March 31, 1964 V. SMOOT 3,127,012
SOLDER DISPENSING PACKAGE
Filed May 22, 1961

Inventor:
Van Smoot
By Henry H. Snelling
his Attorney

United States Patent Office 3,127,012
Patented Mar. 31, 1964

3,127,012
SOLDER DISPENSING PACKAGE
Van Smoot, 2101 S. Parton St., Santa Ana, Calif.
Filed May 22, 1961, Ser. No. 111,766
3 Claims. (Cl. 206—56)

This invention relates to improvements in the packaging of coiled rolls of wire solder so that a short length of the wire, which can possibly have a core of fluxing material, may be pulled from the package and bent to form a straight rod to be brought into contact with a soldering iron and with the work.

The main object of the invention is to provide such a coil with a cover of tightly fitting material to engage each turn of the helix with sufficient area of contact to insure that when the free end of the wire is pressed against the work the last turn will be anchored against rearward movement. This object is achieved by applying to a closely coiled strip of wire solder of one or more helices a constricting cover which seats on each turn of the outside layer for an arc of at least 45° and preferably between 80° and 130°. The constricting or binding action causes the cover to conform to curvature of the coil of solder.

Other objects are as set forth in the claims. The handy solder dispensing package in its preferred form includes but two items, one a closely coiled strip of soldering wire and the other a constricting cover which may be a mere wrapper applied to the roll in any approved manner by a mass production machine, or a printed wrap such as Saran or similar material on which the label is printed before the package is made by enclosing the roll of solder wire in the wrapper and applying pressure to the outside of the cover so that it is pressed down against the several turns of the coil to form a continuous helical groove between proximate turns of the coil. The constrictive cover, while it may be an elongated tubular bag, would usually have both ends closed by crimping, or shrinking, or twisting, or by mere turning the ends into the central bore as the solder wire does not require more protection than is given by this form of wrapping.

Figure 1:
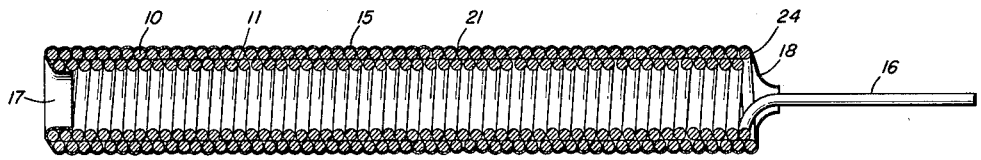
Figure 2:
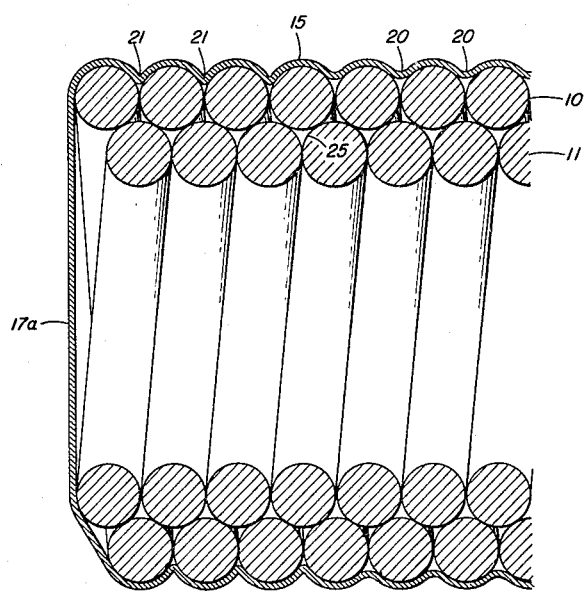
Figure 3:
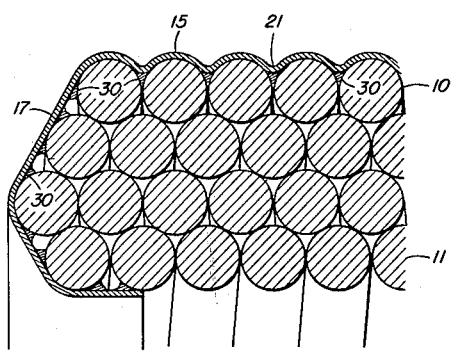

FIG. 1 is a central vertical cross-section showing a portion of the wire intended for contact with the work.
FIG. 2 is a partial section on a much larger scale.
FIG. 3 is a partial section of a modification.

In FIG. 1 a single strip of solder wire is formed into one or more closely coiled layers 10 and 11 in well-known manner as by wrapping the strip around a mandrel of suitable size. Such wrapping preferably should bring each turn of the wire into snug engagement with the preceding turn to keep the package at minimum length for a given amount of weight of solder wire and for other purposes but a slight spacing between turns may allow the constructing cover to engage a greater surface area of the turns and more effectively holding the helix 10, if there be but one layer, in place as the projecting end 16 of the strip is pulled into work position.

The rear end 17 of the cover 15 is partially or completely closed as illustrated but the opposite end 18 is usually merely crimped sufficiently to make a partial closure through which the working end 16 may be seen and be grasped. The inner coils 11, when more than one layer is used, are preferably in snug contact with the outer coil 10 the end 24 of which is at the front closure 18 as the junction of the two integral coils is at the rear end 17.

Referring now to FIG. 2 which shows a small radial section on a much larger scale, the cover is pressed in any chosen manner to embrace an appreciable surface of each turn of the wire, the minimum angle of contact being 45° and the angle preferably being between 80° and 130°, the former being shown by the groove at 20 and the maximum angle being shown at 21. These grooves are not separate valleys but together form one continuous and helical depression similar to threads on a bolt as they lie between the ridges corresponding to the turns of the outer coil.

The inner layer 11 of closely coiled wire snugly engages the outer helix, each turn preferably touching two turns of the outer layer 10 and forming an equilateral triangle 25 with arcs for sides. When the cover, which preferably is electrically non-conducting for safety reasons, is an elongated tubular bag the rear closure 17a is the bottom of the bag. In this form and where the cover is a wrapper the material of the cover may be of the type that shrinks appreciably as it dries.

The material of the cover 15 is of suitable durability, a transparent plastic being preferred. It may be applied in any manner and the groove formed by positive or negative pressure. While a cylindrical package is preferred the cross-section may be elliptical or even square with rounded edges.

The method of use follows known practice. The free or working end 16 of the solder wire is pulled through the hollow center of the package displacing turn after turn of the coil until the chosen length is obtained. The constrictive cover 15 with its helical groove 21 and the engagement of the inner layer 11 with the outer layer 10 prevent retrograde movement of the now rodlike extended end 16 so that the latter may readily be applied to the work while the package is held by one hand. The cover may be of a material having a slightly "sticky" inside surface or an adhesive as 30 in FIG. 3 of non-polluting composition may be used to grip the outside layer of coils.

I claim:
1. A solder dispensing package of only two elements, the product and a cover: comprising a single strip of wire solder wound into an inner coil and an outer coil, the inner coil having an end for manual pulling of a portion of the strip from one end of the package, the coils being coaxial and each turn of the inner coil for its full length snugly engaging both proximate turns of the outer coil, and a constricting cover shrunk to fit each turn of the outer coil for at least 45° in radial angle whereby the engagement of the inner coil with its outer coil and the engagement of the outer coil with the cover will resist movement of the still coiled portion of the strip from the package as the free end of the solder wire is pulled out and prevent retrograde movement of the projecting portion of the solder wire as the extended working end of the strip is applied to the work.

2. The package of claim 1 in which the cover engages the turns of the outer coil in a helical groove with a radial angle of at least 80° of contact with the several turns of the outer layer.

3. The solder dispensing package of claim 1 in which the constricting cover is of a plastic material that shrinks as it dries.

References Cited in the file of this patent
UNITED STATES PATENTS

| | | |
|---|---|---|
| 1,063,646 | Bournonville | June 3, 1913 |
| 2,372,859 | Sparks | Apr. 3, 1945 |
| 2,552,594 | Scott | May 15, 1951 |
| 2,581,561 | Shaw | Jan. 8, 1952 |
| 2,809,748 | Barnaby | Oct. 15, 1957 |
| 2,912,102 | Scott | Nov. 10, 1959 |
| 3,037,620 | Douty | June 5, 1962 |